US012322358B1

(12) United States Patent
Song

(10) Patent No.: US 12,322,358 B1
(45) Date of Patent: Jun. 3, 2025

(54) SINK DEVICE AND OPERATING METHOD THEREOF

(71) Applicant: LG ELECTRONICS INC., Seoul (KR)

(72) Inventor: Chung Won Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/596,070

(22) Filed: Mar. 5, 2024

(51) Int. Cl.
*G09G 5/12* (2006.01)
*G09G 5/18* (2006.01)

(52) U.S. Cl.
CPC ................. *G09G 5/12* (2013.01); *G09G 5/18* (2013.01); *G09G 2340/0435* (2013.01)

(58) Field of Classification Search
None
See application file for complete search history.

(56) References Cited

U.S. PATENT DOCUMENTS

2023/0298539 A1* 9/2023 Wang ....................... G09G 3/32
345/520

FOREIGN PATENT DOCUMENTS

KR 10-2442662 9/2022
KR 10-2510648 3/2023

* cited by examiner

*Primary Examiner* — Stephen T. Reed
(74) *Attorney, Agent, or Firm* — LEE, HONG, DEGERMAN, KANG & WAIMEY

(57) ABSTRACT

An object of the present disclosure is to solve the frame drop problem without buffer constraints under QMS-VRR operation condition.

15 Claims, 7 Drawing Sheets

SINK DEVICE AND OPERATING METHOD THEREOF

CROSS-REFERENCE TO RELATED APPLICATION(S)

Pursuant to 35 U.S.C. § 119(a), this application claims the benefit of earlier filing date and right of priority to Korean Patent Application No. 10-2023-0170998, filed on Nov. 30, 2023, the contents of which are all hereby incorporated by reference herein in their entireties.

BACKGROUND OF THE INVENTION

1. Field of the Invention

The present disclosure relates to a sink device that supports a Quick Media Switching (QMS) function.

2. DISCUSSION OF THE RELATED ART

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

The Quick Media Switching (QMS)—Variable Refresh Rate (VRR) function is a function of minimizes screen stuttering when receiving content with different refresh rates from a source device connected via an HDMI (High Definition Multimedia Interface) port.

For example, when the QMS-VRR function is applied, a user enjoying a film using a set-top box connected to a TV and then watching a sports video will see a smooth video with no black image during screen switching.

However, the QMS-VRR function suffers from dropped frames when the refresh rate of a frame changes.

Specifically, when the frame rate is changed in the QMS-VRR operation condition, the number of buffers is limited, and frames are written and read to some buffers at the same time, causing frame drops.

As a result, artifacts such as video tearing may occur.

SUMMARY OF THE INVENTION

An object of the present disclosure is to solve the frame drop problem without buffer constraints under QMS-VRR operation condition.

An object of the present disclosure is to remove artifacts such as video tearing with limited buffer capacity under QMS-VRR operation condition.

According to an embodiment of the present disclosure, a sink device includes an external device interface including one or more High Definition Multimedia Interface (HDMI) ports, and configured to receive a signal from a source device, and a processor configured to receive an HDMI signal from the source device, determine whether a Quick Media Switching (QMS)—Variable Refresh Rate (VRR) operation condition is satisfied based on the received HDMI signal, and, when the QMS-VRR operation condition is satisfied, synchronize a video signal based on an HDMI input signal received from the source device with the HDMI input signal and output the video signal to a display panel, wherein the processor may determine that the QMS-VRR operation condition is satisfied when each of the source device and the sink device supports a QMS-VRR function, and the QMS-VRR function is enabled in each of the source device and the sink device.

According to an embodiment of the present disclosure, an operating method of a sink device includes receiving an HDMI signal from the source device, determining whether a Quick Media Switching (QMS)—Variable Refresh Rate (VRR) operation condition is satisfied based on the received HDMI signal, and synchronizing a video signal based on an HDMI input signal received from the source device with the HDMI input signal and outputting the video signal to a display panel, when the QMS-VRR operation condition is satisfied, wherein the determining may include determining that the QMS-VRR operation condition is satisfied when each of the source device and the sink device supports a QMS-VRR function, and the QMS-VRR function is enabled in each of the source device and the sink device.

According to an embodiment of the present disclosure, frame drops do not occur without buffer restrictions under QMS-VRR operation condition.

According to an embodiment of the present disclosure, artifacts such as video tearing may be removed with limited buffer capacity under QMS-VRR operation condition.

DETAILED DESCRIPTION OF THE PREFERRED EMBODIMENTS

Hereinafter, embodiments of the present disclosure will be described in detail with reference to the drawings. The suffixes “module” and “unit or portion” for components used in the following description are merely provided only for facilitation of preparing this specification, and thus they are not granted a specific meaning or function.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
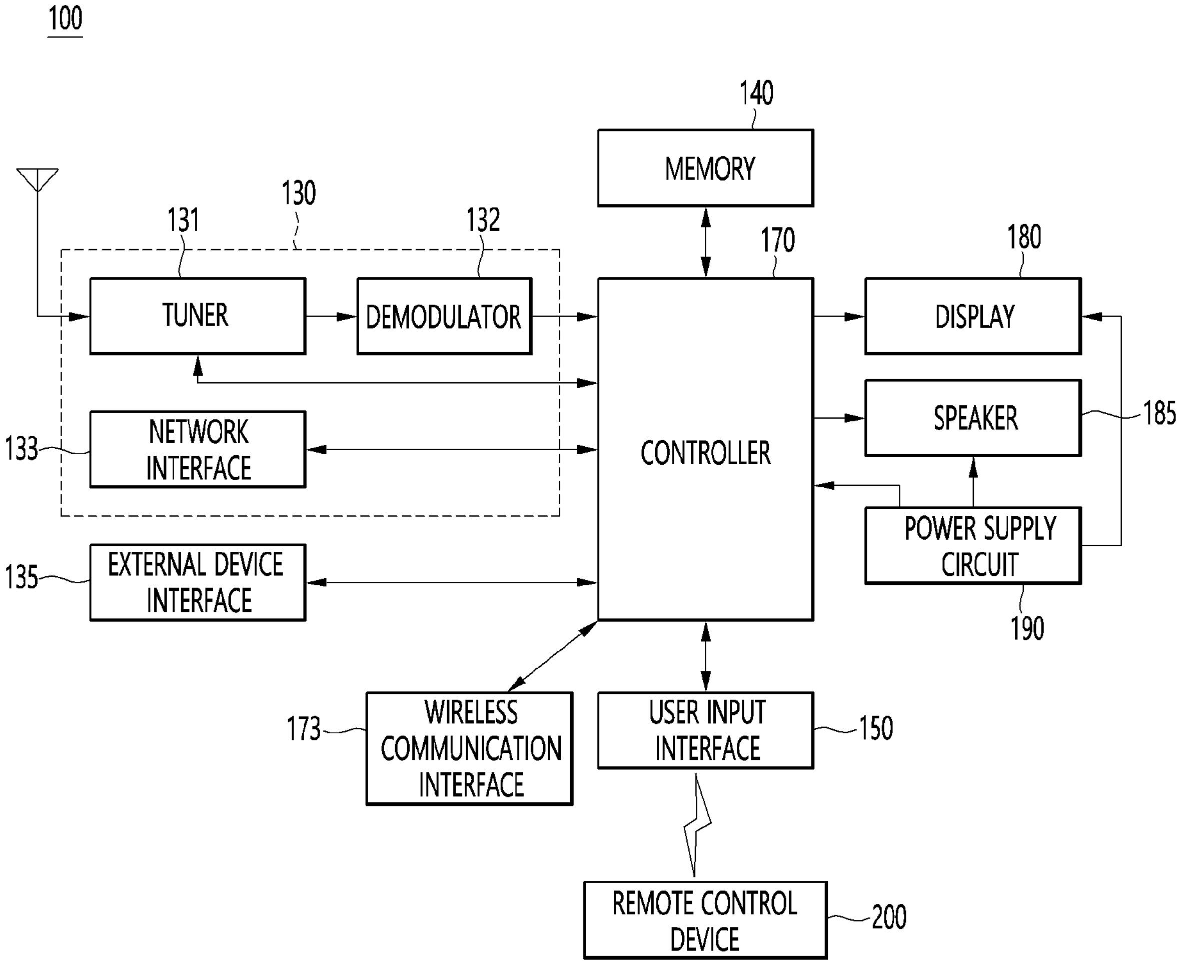
FIG. 1 is a block diagram illustrating a configuration of a display device according to an embodiment of the present invention.

FIG. 1 is a block diagram illustrating a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may separate the received broadcast signal into a video signal, an audio signal, and a data signal related to a broadcast program, and restore the separated video signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of an image and audio output from an external device connected to the display device 100 in a wired or wireless manner, and transmit the same to the controller 170. The external device interface 135 may include a plurality of external input terminals. The plurality of external input terminals may include an RGB terminal, at least one High Definition Multimedia Interface (HDMI) terminal, and a component terminal.

The video signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example . . . .

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, the network interface unit 133 can transmit or receive data to or from a corresponding server by accessing a predetermined webpage through the network.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store video, audio, or data signals, which have been subjected to signal-processed.

In addition, the memory 140 may perform a function for temporarily storing video, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from a remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The video signal image-processed by the controller 170 may be input to the display 180 and displayed as an image corresponding to a corresponding video signal. Also, the video signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed video or audio signal.

In addition, the controller 170 may output a video signal or an audio signal through the display 180 or the speaker 185, according to a command for playing back a video of an external device through the user input interface 150, the video signal or the audio signal being input from an external device, for example, a camera or a camcorder, through the external device interface 135.

Meanwhile, the controller 170 may allow the display 180 to display video, for example, allow a broadcast video which is input through the tuner 131 or an external input video which is input through the external device interface 135, a video which is input through the network interface unit or a video which is stored in the memory 140 to be displayed on the display 180. In this case, an image being displayed on the display 180 may be a still image or a moving image, and may be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The wireless communication interface 173 may communicate with an external device through wired or wireless communication. The wireless communication interface 173 may perform short range communication with an external device. To this end, the wireless communication interface 173 may support local communication using at least one of Bluetooth™ Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Accordingly, a user of the wearable device can use the data processed in the display device 100 through the wearable device.

The display 180 may convert video signals, data signals, and OSD signals processed by the controller 170, or video signals or data signals received from the external device interface 135 into R, G, and B signals, and generate drive signals.

The display 180 may be either an Organic Light Emitting Diode (OLED) display or a Liquid Crystal Display (LCD).

Furthermore, the display device 100 shown in FIG. 1 is just one embodiment of the present disclosure and thus, some of the components shown can be integrated, added, or omitted according to the specification of the actually implemented display device 100.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive video through the network interface 133 or the external device interface 135 without a tuner 131 and a demodulator 132 and play back the video.

For example, the display device 100 can be divided into an image processing device such as a set-top box for receiving broadcast signals or contents according to various network services and a content playback device for playing contents input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Hereinafter, a source device may be a device that transmits one or more of a video signal or an audio signal to a sink device, and a sink device may be a device that outputs one or more of a video signal or an audio signal received from the source device.

The source device may be a set-top box, and the sink device may be a TV, but this is only an example.

Additionally, hereinafter, a scan rate, a frame rate, and a refresh rate may all have the same concept.

Figure 2:
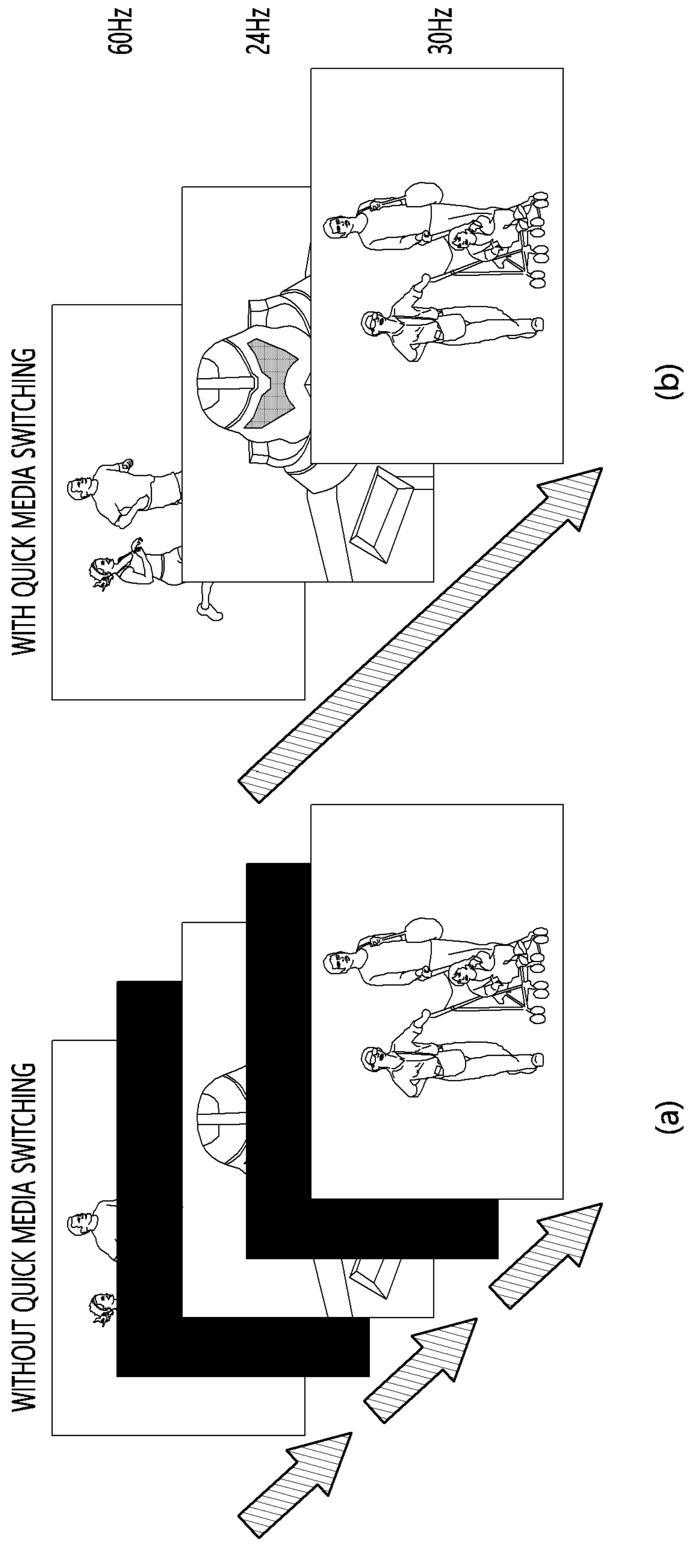
FIG. 2 is a diagram for describing a QMS-VRR function.

FIG. 2 is a diagram for describing a QMS-VRR function.

The VRR function is a function in which a sink device outputs a frame by adjusting the refresh rate of a display panel provided in the sink device to match the refresh rate of an input frame when the refresh rate (or scan rate) of a frame input from the source device is changed.

The QMS-VRR function is a function that minimizes screen stuttering when receiving content with different refresh rates from a source device connected via an HDMI port.

FIG. 2A is a diagram for describing problems that occur when the QMS-VRR function is not applied.

The sink device may change the refresh rate of the display panel to match the refresh rate of a frame received from the source device to prevent motion judder.

In this case, as the refresh rate of frames changes (60 Hz→24 Hz→30 Hz), the sink device may experience screen stuttering issues, such as outputting black video before and after the screen switching.

FIG. 2B is a diagram for describing an example in which screen stuttering do not occur even when the refresh rate of frames is changed using the QMS-VRR function.

The QMS-VRR function may be a function that prevents screen stuttering by allowing a sink device to know in advance the refresh rate of a frame to be changed through metadata included in an HDMI input signal received from the source device to solve the screen stuttering problem.

Accordingly, a user may not experience any inconvenience in viewing as the black image is not output when the screen is switched.

However, when applying the QMS-VRR function, problems such as screen tearing may occur due to limitations in a memory buffer.

Figure 3:
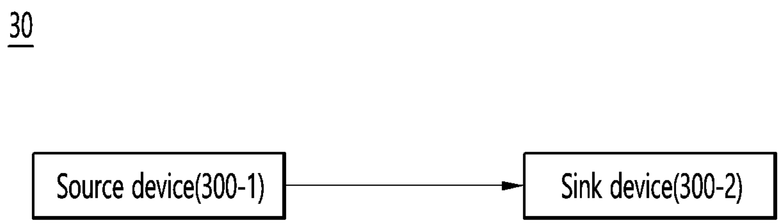
FIG. 3 is a diagram for describing the configuration of a display system 30 according to an embodiment of the present disclosure.

FIG. 3 is a diagram for describing the configuration of a display system 30 according to an embodiment of the present disclosure.

Referring to FIG. 3, the display system 30 may include a source device 300-1 and a sink 300-2.

The source device 300-1 may be an external device such as a set-top box or game console.

The sink device 300-2 may receive and output one or more of a video signal or an audio signal from the source device 300-1.

The sink device 300-2 may be the display device 100 of FIG. 1.

The source device 300-1 and the sink device 300-2 may be connected to each other through the HDMI standard.

The source device 300-1 may be a set-top box, and the sink device may be the display device 100 of FIG. 1.

The source device 300-1 may transmit one or more of a video signal or an audio signal to the sink device 300-2.

The sink device 300-2 may output one or more of the received video signal or audio signal.

Figure 4:
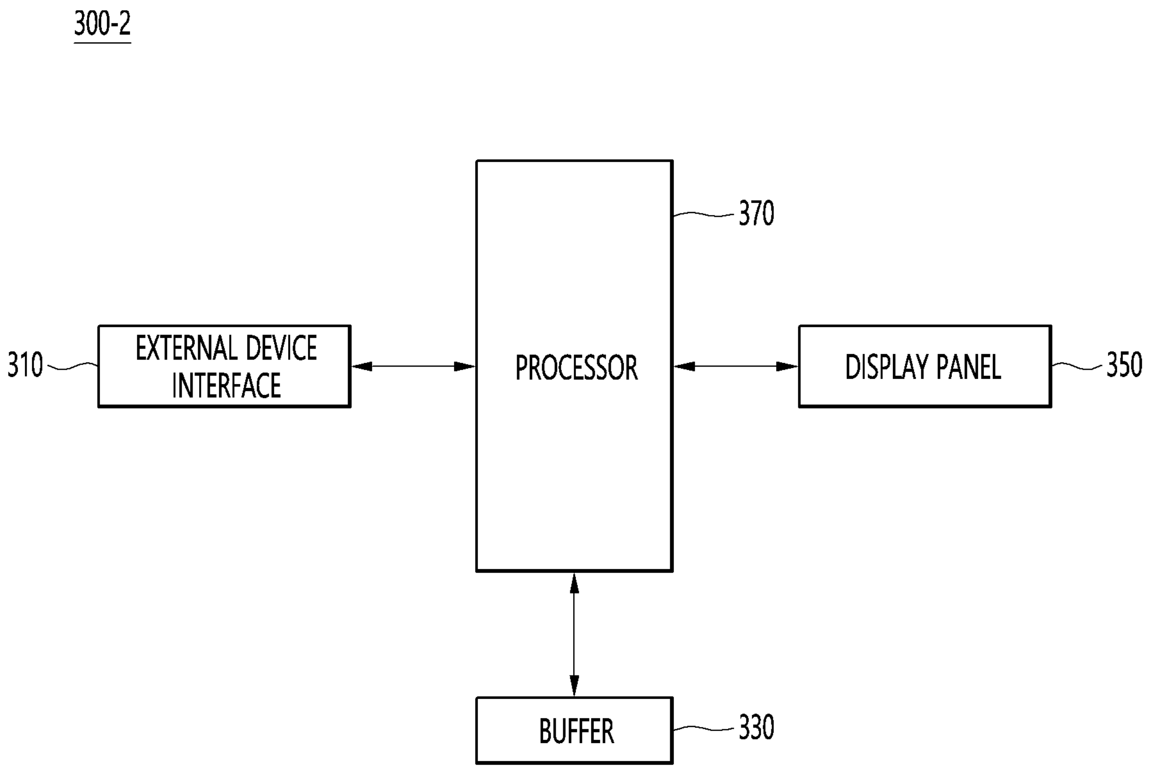
FIG. 4 is a block diagram for describing the configuration of a sink device according to an embodiment of the present disclosure.

FIG. 4 is a block diagram for describing the configuration of a sink device according to an embodiment of the present disclosure.

Referring to FIG. 4, the sink device 300-2 may include an external device interface 310, a buffer 330, a display panel 350, and a processor 370.

The external device interface 310 may be the external device interface 135 of FIG. 1.

The external device interface 310 may have one or more HDMI ports.

The external device interface 310 may receive an HDMI signal or an HDMI input signal from the connected source device 300-1.

The buffer 330 may temporarily store video frames included in the HDMI input signal.

The buffer 330 may also be included in the processor 370.

The display panel 350 may display video frames read from the buffer 330.

The processor 370 may control the overall operation of the sink device 300-2. The processor 370 may be a System On Chip (SoC).

The processor 370 may determine whether the QMS-VRR operation condition is satisfied based on the received HDMI signal.

When it is determined that the QMS-VRR operation condition is satisfied, the processor 370 may set a video output mode to a timing sync mode.

The processor 370 may synchronize the output timing of a video signal with an HDMI input signal under the timing sync mode.

The processor 370 may output the video signal synchronized with the HDMI input signal to the display panel 350.

When it is determined that the QMS-VRR operation condition is not satisfied, the processor 370 may set the video output mode to a free run mode.

The sink device 300-1 may include only an external device interface 310, a buffer 330, and a processor 370. That is, the display panel 350 may be provided separately and connected to the sink device 300-1 through the external device interface 310.

Figure 5A:
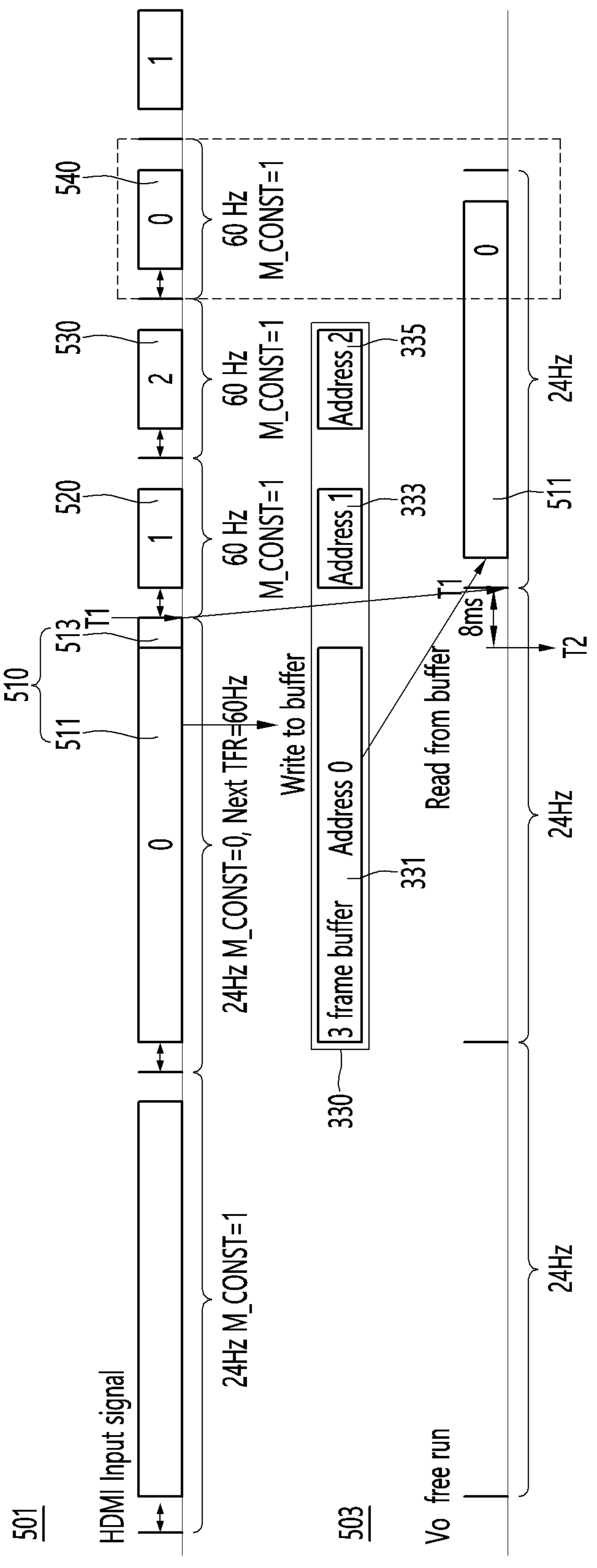
FIG. 5A is a diagram for describing a problem that occurs as a video output mode operates in a free run mode when a sink device receives an HDMI input signal from a source device under QMS-VRR operation condition according to the prior art.
Figure 5B:
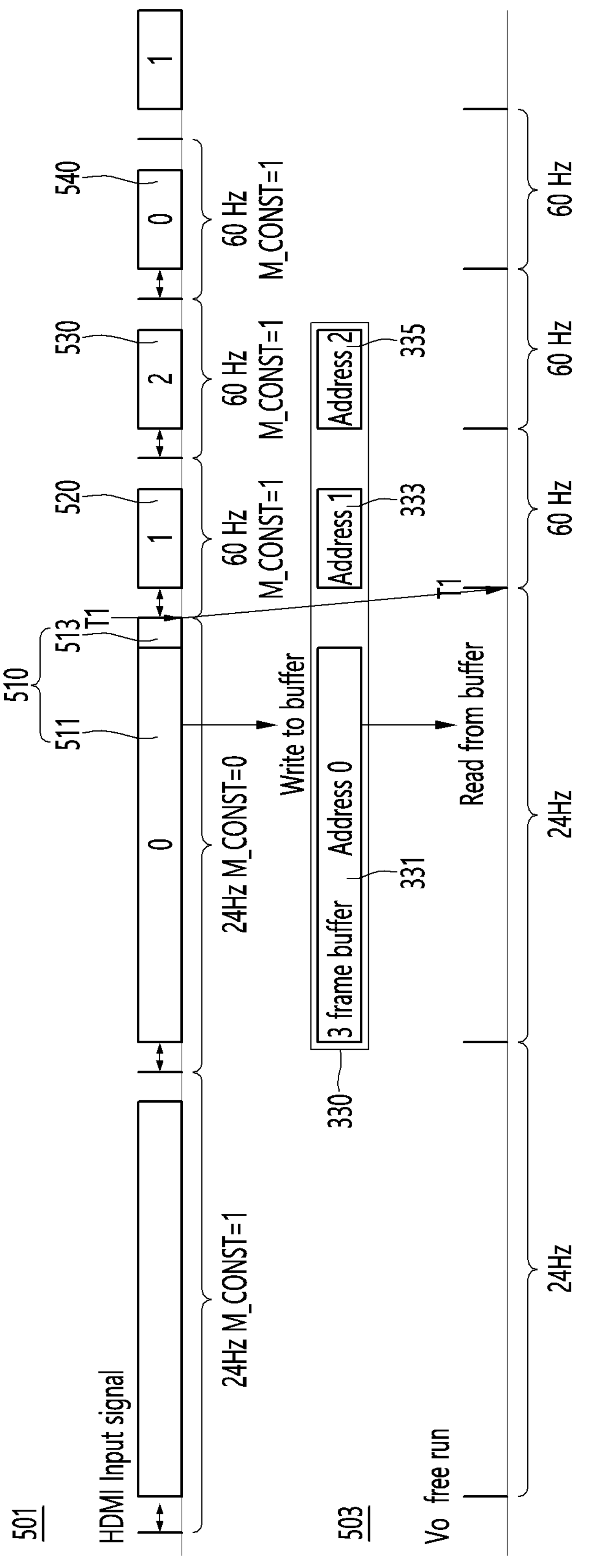
FIG. 5B is a diagram for describing an example in which a video output mode operates in a timing sync mode when a sink device receives an HDMI input signal from a source device under QMS-VRR operation condition according to an embodiment of the present disclosure.

FIG. 5A is a diagram for describing a problem that occurs as a video output mode operates in a free run mode when a sink device receives an HDMI input signal from a source device under QMS-VRR operation condition according to the prior art, and FIG. 5B is a diagram for describing an example in which a video output mode operates in a timing sync mode when a sink device receives an HDMI input signal from a source device under QMS-VRR operation condition according to an embodiment of the present disclosure.

A video output mode may include a free run mode and a timing sync mode. The free run mode may be referred to as a first video output mode, and the timing sync mode may be referred to as a second video output mode.

The free run mode may be a mode in which an SOC (System On Chip) performs processing (noise removal, etc.) on video frames written in a buffer and reads the processed video frames in an asynchronous manner with an HDMI input signal.

The HDMI input signal may be output stably even in unstandard input timing under the free run mode.

However, the video output signal output to the display panel under the free run mode is not synchronized with the HDMI input signal, making it vulnerable to frame repetition and drop problems.

The timing sync mode may be a mode in which the SOC (processor, 370) reads the video frames written in the buffer in a synchronous manner with an HDMI input signal as they are.

Since the video output signal is synchronized with the HDMI input signal under the timing sync mode, frame repetition and frame drop problems do not occur.

Referring to FIG. 5A, a timing diagram 501 of an HDMI input signal and a timing diagram 503 of a video output signal based on the HDMI input signal when the video output mode is set to free run mode are shown.

According to the timeline 501 of the HDMI input signal, an HDMI input signal of 24 Hz is input through the external device interface 310.

In FIG. 5A, the buffer 330 may be a 3 frame buffer. The 3 frame buffer may be a buffer that temporarily stores only 3 video frames.

The 3 frame buffer 330 may include a first address buffer 331 with an address value of 0, a second address buffer 333 with an address value of 1, and a third address buffer 335 with an address value of 2 . . . .

The HDMI input signal may include a frame 510 with a refresh rate of 24 Hz. The frame 510 may include an active video area 511 containing video data (e,g., RGB data) and a blank area 513 containing additional information of the video data. The active video area 511 may include data about video to be displayed on the display panel 350 and may be named a video frame.

The blank area 513 may be an area including additional information about the video frame. The blank area 513 may include video timing extended metadata (VTEM).

The VTEM may include an M_CONST field indicating whether a change in frame rate is allowed and a NEXT TFR field including the target frame rate of a next frame.

When the value of the M_CONST field is 0, it may indicate that a change in frame rate is allowed, and when the value of the M_CONST field is 1, it may indicate that a change in frame rate is not allowed.

The NEXT TFR field may include the value of the target frame rate of the next frame. A frame rate may have the same meaning as a refresh rate.

The processor 370 may acquire the VTEM by parsing the blank area 513 of the frame 510 of 60 Hz.

The processor 370 may determine that the frame rate of the HDMI input signal is scheduled to change when the value of the M_CONST field included in the VTEM of the blank area 513 is 0 and the value of the NEXT TFR field is 60 Hz.

The processor 370 may determine that the frame rate changes at a first time point T1.

Meanwhile, the processor 370 may write the video frame 511 of 24 Hz to a first address buffer 331, write the first video frame 520 of 60 Hz to a second address buffer 333, and write a second video frame 530 of 60 Hz to a third address buffer 335.

The processor 370 may read the video frame 511 of 24 Hz from the first address buffer 331, read the first video frame 520 of 60 Hz from the second address buffer 333, and read the second video frame 530 of 60 Hz from the third address buffer 335.

When reading a video frame from the buffer 330, the processor 370 may perform processing (or correction) for stable output of the video frame. The processing for stable output may be a task such as noise removal.

The processor 370 may determine a frame rate from a second time point T2, which is 8 ms before the output time of the next frame.

The 8 ms may be the minimum time required to determine a change in frame rate. The 8 ms may be the minimum time to generate a video output signal of the next frame rate.

The VTEM exists in the blank area 513 of the frame 510 and is near the end of the frame 510. Accordingly, the processor 370 cannot check the VTEM included in the blank area 513 at the time of generating the video output signal.

The processor 370 needs to change the next frame rate to 60 Hz and generate a video output signal. However, since the processor 370 does not know the VTEM information indicating that the value of the M_CONST field is 0 and the value of the Next TFR field is 60 Hz, within a time period of 8 ms, the processor 370 may repeatedly read the previous video frame 511.

That is, the processor 370 may repeatedly read the video frame 511 of 24 Hz, which had been previously read, from the first address buffer 331. As the video frame 511 of 24 Hz is read repeatedly, a problem occurs in which the first video frame 520 and the second video frame 530, which are both of 60 Hz, are omitted (or dropped).

In addition, the third video frame 540 of 60 Hz is written to the first address buffer 331 and the video frame 511 of 24 Hz is read at the same time, which may cause video tearing.

When the QMS-VRR function is enabled and the video output mode is set to the free run mode, the video tearing may occur due to frame repetition and dropping, as described above.

In an embodiment of the present disclosure, when the QMS-VRR function is enabled, the video output mode is set to the timing sync mode to solve the above problem.

Referring to FIG. 5B, a timing diagram 501 of an HDMI input signal and a timing diagram 505 of a video output signal based on the HDMI input signal when the video output mode is set to the timing sync mode are shown.

According to the timeline 501 of the HDMI input signal, an HDMI input signal of 24 Hz is input through the external device interface 310.

In FIG. 5B, the buffer 330 may be a 3 frame buffer. The 3 frame buffer may be a buffer that temporarily stores only 3 video frames.

The 3 frame buffer 330 may include a first address buffer 331 with an address value of 0, a second address buffer 333 with an address value of 1, and a third address buffer 335 with an address value of 2 . . . .

The HDMI input signal may include a frame 510 with a refresh rate of 24 Hz. The frame 510 may include an active video area 511 and a blank area 513.

The active video area 511 may include data about video to be displayed on the display panel 350 and may be named a video frame.

The blank area 513 may be referred to as an additional information area.

The blank area 513 may be an area including additional information about the video frame. The blank area 513 may include video timing extended metadata (VTEM).

The VTEM may include an M_CONST field indicating whether a change in frame rate is allowed and a NEXT TFR field including the target frame rate of a next frame.

When the value of the M_CONST field is 0, it may indicate that a change in frame rate is allowed, and when the value of the M_CONST field is 1, it may indicate that a change in frame rate is not allowed.

The NEXT TFR field may include the value of the target frame rate of the next frame. A frame rate may have the same meaning as a refresh rate.

The processor 370 may acquire the VTEM by parsing the blank area 513 of the frame 510 of 60 Hz.

The processor 370 may determine that the frame rate of the HDMI input signal is scheduled to change when the value of the M_CONST field included in the VTEM of the blank area 513 is 0 and the value of the NEXT TFR field is 60 Hz.

Under the timing sync mode, the processor 370 may read and output video frames written in the buffer as they are.

That is, the processor 370 may read the video frame 511 of 24 Hz written in the first address buffer 331 as it is and output the video frame 511 to the display panel 350, read the first video frame 520 of 60 Hz written in the second address buffer 333 as it is and output the first video frame 520 to the display panel 350, and read the video frame 530 of 60 Hz written in the third address buffer 335 as it is and output the video frame 530 to the display panel 350.

Under the timing sync mode, the processor 370 may read video frames written in the buffer 330 as they are and output the read video frames to the display panel 350.

Accordingly, as shown in FIG. 5A, there is no problem in which the video frame 511 of 24 Hz is output repeatedly, and frame drops may not occur.

In addition, a problem in which the video frame 511 of 24 Hz is read at the same time as the third video frame 540 of 60 Hz is written to the first address buffer 331 does not occur, thereby preventing video tearing.

Figure 6:
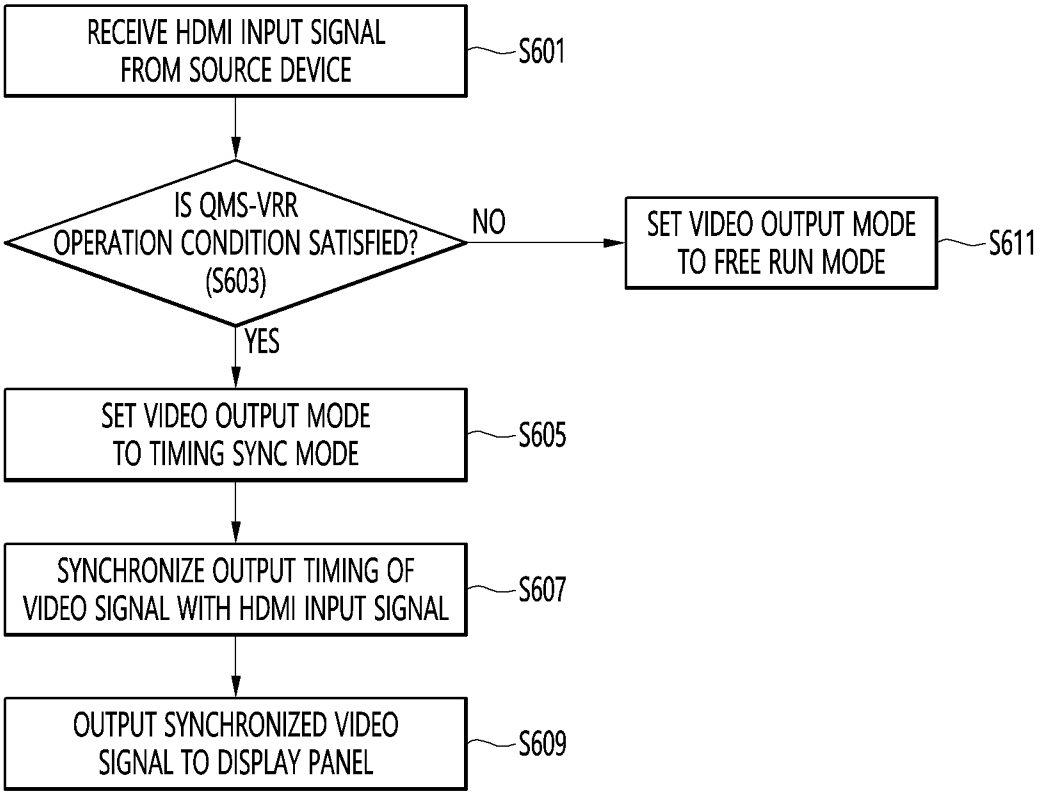
FIG. 6 is a flowchart for describing an operating method of a sink device according to an embodiment of the present disclosure.

FIG. 6 is a flowchart for describing an operating method of a sink device according to an embodiment of the present disclosure.

Referring to FIG. 6, the processor 370 may receive an HDMI signal from the source device 300-1 through the external device interface 310 (S601).

The external device interface 310 may include one or more HDMI ports.

A source device (300-1, external device) may be connected to each HDMI port. The source device may be any of a game console, set-top box, or DVD player.

The HDMI signal may include Extended Display Identification Data (EDID) transmitted through an HDMI cable. The EDID may include information about the source device. The EDID may include information about whether the source device 300-1 supports the QMS-VRR function and whether the QMS-VRR function is enabled in the source device 300-1.

In the process of exchanging information with the source device 300-1 through an HDMI connection, the sink device 300-2 may acquire information indicating whether the source device 300-1 supports the QMS-VRR function and whether the QMS-VRR function is enabled in the source device 300-1.

The QMS-VRR function may be enabled or disabled through a user input to the settings menu of the source device 300-1 or the sink device 300-2.

The processor 370 of the sink device 300-2 may determine whether the QMS-VRR operation condition is satisfied based on the received HDMI signal (S603).

The QMS-VRR operation condition may be satisfied when the source device 300-1 and the sink device 300-2 each support the QMS-VRR function, and the QMS-VRR function are enabled in the source device 300-1 and the sink device 300-2.

The processor 370 may determine whether the source device 300-1 supports the QMS-VRR function and whether the QMS-VRR function is enabled, based on information included in an HDMI signal received from the source device 300-1.

When either the source device 300-1 or the sink device 300-2 does not support the QMS-VRR function, the processor 370 may determine that the QMS-VRR operation condition is not satisfied.

The processor 370 may determine that the QMS-VRR operation condition is not satisfied when the source device 300-1 and the sink device 300-2 both support the QMS-VRR function, but the QMS-VRR function of any one of the source device 300-1 and the sink device 300-2 is disabled.

When it is determined that the QMS-VRR operation condition is satisfied, the processor 370 may set the video output mode to the timing sync mode (S605).

When the processor 370 determines that the QMS-VRR operation condition is satisfied while the video output mode of the sink device 300-2 is set to the free run mode that is an asynchronous manner, the processor 370 may switch from the free run mode to the free run mode that is synchronous manner.

Accordingly, the processor 370 may synchronize the HDMI input signal and output the synchronized video signal to the display panel 350, as shown in FIG. 5B.

Under the timing sync mode, the processor 370 may synchronize the output timing of a video signal with an HDMI input signal (S607).

The processor 370 may output a video signal synchronized with the HDMI input signal to the display panel 350 (S609).

As shown in FIG. 5B, the processor 370 may read the video frame of the HDMI input signal written in the buffer 330 as it is and output the video frame to the display panel 350.

Accordingly, as shown in FIG. 5A, there is no problem in which the video frame 511 of 24 Hz is output repeatedly, and frame drops may not occur.

In addition, a problem in which the video frame 511 of 24 Hz is read at the same time as the third video frame 540 of 60 Hz is written to the first address buffer 331 does not occur, thereby preventing video tearing.

When it is determined that the QMS-VRR operation condition is not satisfied, the processor 370 may set the video output mode to a free-run mode (S611).

When it is determined that the QMS-VRR operation condition is not satisfied, the processor 370 may set the video output mode to the free run mode as shown in FIG. 5A for stable output.

Figure 7:
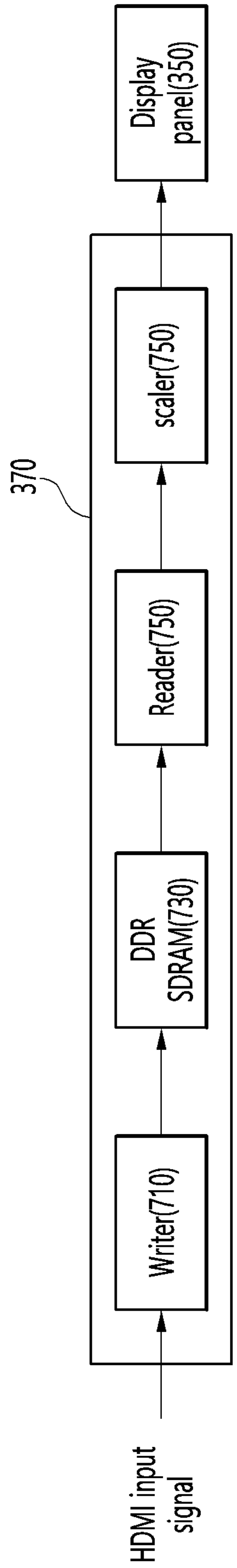
FIG. 7 is a diagram for describing the configuration of a processor of a sink device according to an embodiment of the present disclosure.

FIG. 7 is a diagram for describing the configuration of a processor of a sink device according to an embodiment of the present disclosure.

The processor 370 may include a writer 710, a double data date synchronous dynamic random access memory (DDR SDRAM) 730, a reader 750, and a scaler 750.

The writer 710 may write video frames to the DDR SDRAM 730 from an HDMI input signal received from the source device 300-1.

The DDR SDRAM 730 may be the buffer 330 of FIG. 4. That is, the buffer 300 may be configured separately from the processor 370 or may be included in the processor 370. The DDR SDRAM 730 may be a 3 frame buffer that temporarily stores only 3 frames.

The reader 750 may read a video frame written in the DDR SDRAM 730. The reader 750 may transmit the read video frame to scaler 750.

The reader 750 may determine whether a video signal is synchronized with an HDMI input signal according to the setting of the video output mode.

The reader 750 may desynchronize the video signal with the HDMI input signal when the video output mode is the free run mode.

The reader 750 may synchronize the video signal with the HDMI input signal when the video output mode is the timing sync mode.

When the QMS-VRR operation condition is satisfied, the reader 750 may set the video output mode to the timing sync mode.

When the QMS-VRR operation condition is satisfied, the reader 750 may switch the video output mode from the free run mode to the timing sync mode.

The scaler 750 may scale a video frame. The scaler 750 may upscale or downscale a video frame.

The scaler 750 may output a scaled video frame to the display panel 350.

The display panel 350 may display the scaled video which is received from the scaler 750.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A sink device comprising:

an external device interface including one or more High Definition Multimedia Interface (HDMI) ports, and configured to receive a signal from a source device; and a processor configured to receive an HDMI signal from the source device, determine whether a Quick Media Switching (QMS)—Variable Refresh Rate (VRR) operation condition is satisfied based on the received HDMI signal, and, when the QMS-VRR operation condition is satisfied, synchronize a video signal based on an HDMI input signal received from the source device with the HDMI input signal and output the video signal to a display panel, wherein the processor is configured to determine that the QMS-VRR operation condition is satisfied when each of the source device and the sink device supports a QMS-VRR function, and the QMS-VRR function is enabled in each of the source device and the sink device.

2. The sink device of claim 1, wherein a video output mode of the sink device includes a free run mode for outputting a video frame included in the HDMI input signal to the display panel in an asynchronous manner, and a timing sync mode for outputting the video frame included in the HDMI input signal to the display panel in a synchronous manner, wherein the processor is configured to:

set the video output mode to the timing sync mode when the QMS-VRR operation condition is satisfied; and set the video output mode to the free run mode when the QMS-VRR operation condition is not satisfied.

3. The sink device of claim 1, wherein the HDMI signal includes information about whether the source device supports the QMS-VRR function and whether the QMS-VRR function is enabled in the source device.

4. The domain adaptation device of claim 2, wherein the processor is configured to write a video frame included in the HDMI input signal to a buffer under the timing sync mode, read the video frame from the buffer, synchronize the read video frame with the HDMI input signal and output the video frame to the display panel.

5. The domain adaptation device of claim 4, wherein the buffer is a 3-frame buffer that temporarily stores three video frames.

6. The sink device of claim 1, wherein the HDMI input signal includes:

a video frame; and

Video Timing Extended Metadata (VTEM) including an M_CONST field indicating whether a change in frame rate is allowed and a NEXT TFR field including a target frame rate of a next frame.

7. The domain adaptation device of claim 6, wherein the processor is configured to determine a value of the NEXT TFR field as a next frame rate when a value of the M_CONST field is 0.

8. The sink device of claim 1, further comprising:

a display panel configured to display a video signal synchronized with the HDMI input signal.

9. An operating method of a sink device, comprising:

receiving an HDMI signal from the source device;

determining whether a Quick Media Switching (QMS)—Variable Refresh Rate (VRR) operation condition is satisfied based on the received HDMI signal; and synchronizing a video signal based on an HDMI input signal received from the source device with the HDMI input signal and outputting the video signal to a display panel, when the QMS-VRR operation condition is satisfied, wherein the determining includes determining that the QMS-VRR operation condition is satisfied when each of the source device and the sink device supports a QMS-VRR function, and the QMS-VRR function is enabled in each of the source device and the sink device.

10. The operating method of claim 9, wherein a video output mode of the sink device includes a free run mode for outputting a video frame included in the HDMI input signal to the display panel in an asynchronous manner, and a timing sync mode for outputting the video frame included in the HDMI input signal to the display panel in a synchronous manner, wherein the operating method further comprises:

setting the video output mode to the timing sync mode when the QMS-VRR operation condition is satisfied; and setting the video output mode to the free run mode when the QMS-VRR operation condition is not satisfied.

11. The operating method of claim 9, wherein the HDMI signal includes information about whether the source device supports the QMS-VRR function and whether the QMS-VRR function is enabled in the source device.

12. The operating method of claim 10, wherein the outputting includes writing a video frame included in the HDMI input signal to a buffer, under the timing sync mode;

reading the video frame from the buffer, synchronize the read video frame with the HDMI input signal; and outputting the video frame to the display panel.

13. The operating method of claim 12, wherein the buffer is a 3-frame buffer that temporarily stores three video frames.

14. The operating method of claim 9, wherein the HDMI input signal includes:

a video frame; and

Video Timing Extended Metadata (VTEM) including an M_CONST field indicating whether a change in frame rate is allowed and a NEXT TFR field including a target frame rate of a next frame.

15. The operating method of claim 14, further comprises:

determining a value of the NEXT TFR field as a next frame rate when a value of the M_CONST field is 0.

* * * * *